US011144418B2

(12) United States Patent
Kitahara et al.

(10) Patent No.: US 11,144,418 B2
(45) Date of Patent: Oct. 12, 2021

(54) MUTATION EVENT DETECTION FOR INTEGRITY MONITORING

(71) Applicant: INTERNATIONAL BUSINESS MACHINES CORPORATION, Armonk, NY (US)

(72) Inventors: Hirokuni Kitahara, Tokyo (JP); Yuji Watanabe, Tokyo (JP); Fumiko Akiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/578,868

(22) Filed: Sep. 23, 2019

(65) Prior Publication Data

US 2021/0089420 A1 Mar. 25, 2021

(51) Int. Cl.
G06F 11/00 (2006.01)
G06F 11/30 (2006.01)
G06F 9/54 (2006.01)

(52) U.S. Cl.
CPC .......... *G06F 11/3006* (2013.01); *G06F 9/542* (2013.01); *G06F 11/3024* (2013.01); *G06F 11/3065* (2013.01); *G06F 11/3089* (2013.01)

(58) Field of Classification Search
CPC ............. G06F 11/3692; G06F 11/3636; G06F 11/3006
See application file for complete search history.

(56) References Cited

U.S. PATENT DOCUMENTS

| 6,986,076 B1 | 1/2006 | Smith et al. |
| 8,589,447 B1 * | 11/2013 | Grunwald ............. G06F 16/182 |
| | | 707/797 |
| 2015/0154164 A1 * | 6/2015 | Goldstein ............. G06F 40/103 |
| | | 715/229 |
| 2017/0293762 A1 | 10/2017 | Karhunen |
| 2018/0293374 A1 | 10/2018 | Chen |

FOREIGN PATENT DOCUMENTS

| CN | 108737215 A | 11/2018 |
| CN | 108878157 A | 11/2018 |
| CN | 110262941 A | 9/2019 |
| WO | 2019135945 A1 | 7/2019 |

OTHER PUBLICATIONS

International Search Report for PCT/IB2020/058815 dated Jan. 15, 2021 (9 pages).
Mell, Peter, et al., "The NIST Definition of Cloud Computing," 2011, 7 pages.
https://sysdig.com/, Sep. 2019, 12 pages.
(Continued)

*Primary Examiner* — Charles Ehne
(74) *Attorney, Agent, or Firm* — Tutunjian & Bitetto, P.C.; Randall Bluestone (57) ABSTRACT

A computer-implemented method includes generating one or more process trees based on one or more processes associated with one or more change events within a cluster computing system, performing mutation event detection by comparing a root of each of the one or more process trees with one or more external commands, and generating a mutation event report based on the comparison.

20 Claims, 7 Drawing Sheets

(56) References Cited

OTHER PUBLICATIONS https://github.com/draios/sysdig, Sep. 2019, 3 pages.
https://falco.org/, Sep. 2019, 3 pages.
https://github.com/falcosecurity/falco, Sep. 2019, 3 pages.
Watanabe, "Mutation Advisor in IBM Cloud Private", https://medium.com/ibm-cloud/mutation-advisor-in-ibm-cloud-private-79a8d62ad180, Nov. 2019, 4 pages.
PCI Security Standards Council, "PCI Quick Reference Guide: Understanding the Payment Card Industry Data Security Standard Version 1.2", Jul. 2014, Requirement 11.5, p. 23.
NIST Special Publication 800-53, SI-7, Jan. 2018, 6 pages.

\* cited by examiner

| Time | k8s.ns.name | k8s.pod.name | container.name | proc.cmdline | entry_proc | proc.vpgid | proc.vpid |
|---|---|---|---|---|---|---|---|
| July 1, 2019, 18:36:28.405 | cognitive-data | conv-a-s04-csfdev-data-exhaust-healthcheck-5c8cd97fd5-dllhf | data-exhaust-producer | sh –c curl –kv – XPOST –F data="{\"data\": \"this is an end-to-end test message at 'date\'}" –F cos="{\"cos\": \"this is an end-to-end test message at 'date\'}" –H X-Watson-DataLabel-CustomerID:$(date +%Y-%m-%d-%H) –H X-Watson- | true | 54,131 | 54,131 |

MUTATION EVENT DETECTION FOR INTEGRITY MONITORING

BACKGROUND

The present invention generally relates to computer systems, and more particularly to mutation event detection for integrity monitoring.

System and information integrity monitoring can be needed as part of compliance and audit standards. Such standards can include, but are not limited to, Payment Card Industry Data Security Standards (PCI/DSS) (e.g., PCI Requirement 11.5), National Institute of Standards and Technology (NIST) Standards (e.g., NIST Special Publication 800-53 (SI-7)), etc.

SUMMARY

In accordance with an embodiment of the present invention, a system is provided. The system includes a memory device for storing program code and at least one hardware processor operatively coupled to the memory device. The at least one hardware processor is configured to execute program code stored on the memory device to generate one or more process trees based on one or more processes associated with one or more change events within a cluster computing system, perform mutation event detection by comparing a root of each of the one or more process trees with one or more external commands, and generate a mutation event report based on the comparison.

In accordance with another embodiment of the present invention, a computer-implemented method is provided. The method includes generating one or more process trees based on one or more processes associated with one or more change events within a cluster computing system, performing mutation event detection by comparing a root of each of the one or more process trees with one or more external commands, and generating a mutation event report based on the comparison.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein provide for the detection of mutation events for cluster computing systems. A cluster computing system can include one or more groups of connected computer devices, or clusters, that work together to perform tasks. Clusters can have each node set perform the same tasks, which can be controlled and scheduled by software.

As used herein, a mutation event refers to a change event corresponding to an unintended change that occurs within a cluster. More specifically, the embodiments described herein can collect change events, and extract mutation events from the change events. The change events can include low level events such as, e.g., file create, updates, delete and process start. The mutation events can be extracted (1) without program or image analysis and (2) with the ability to filter out infrequent or rare non-mutation (e.g. intended) events.

For example, the embodiments described herein can be implemented with a cluster computing system including a container-orchestration system for automating application deployment, scaling and management. A container is a package that uses operating system (OS)-level virtualization to deliver software. Containers are isolated from each other and can bundle their own software, libraries and configuration files. Since containers are run by a single OS kernel, they are more lightweight than, e.g., virtual machines. For example, the cluster can include a Kubernetes ("k8s") container-orchestration system. Kubernetes is an open-source container-orchestration system that can be used with a variety of container tools.

The embodiments described herein can be used to meet compliance with system and information integrity standards including, but not limited to, PCI/DSS (e.g., PCI Requirement 11.5), NIST Standards (e.g., NIST Special Publication 800-53 (SI-7)), etc. For example, when PCI Requirement 11.5 is applied to containers, whose behaviors are particularly well-defined, mutations in the container can predict an abnormal change in the behavior of the container. Such behavior changes can be evaluated (after accounting for known changes to be expected in the container based on a whitelisted profile) by the system administrator for further investigation. The investigation may indicate malicious activity (new malicious files or processes), bitcoin miners, or containers in an unhealthy state.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Figure 1:
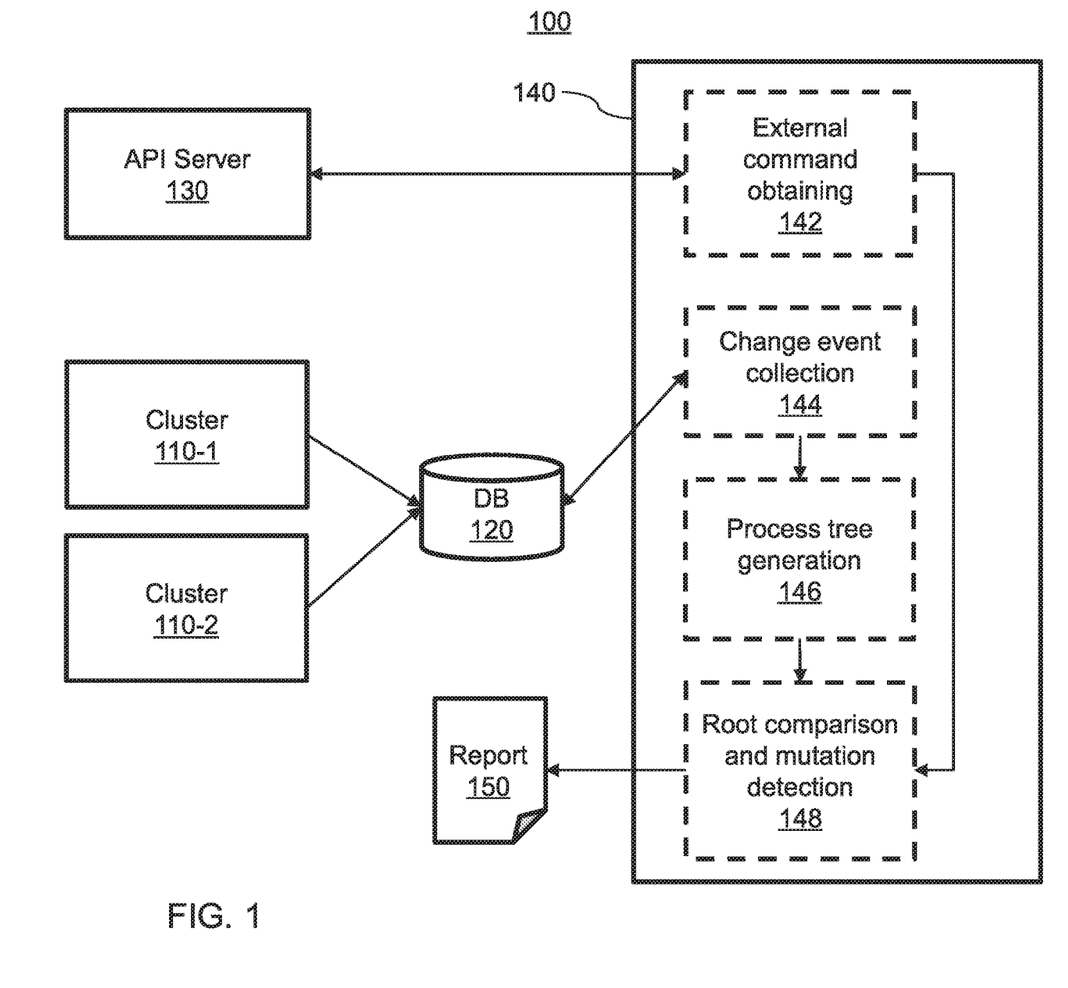
FIG. 1 is a block/flow diagram of an overview of a cluster computing system, in accordance with an embodiment of the present invention.

Referring now to the drawings in which like numerals represent the same or similar elements and initially to FIG. 1, an overview of a cluster computing system 100 is provided. In one embodiment, the system 100 includes a container-orchestration system. For example, the system 100 can include, e.g., a Kubernetes container-orchestration system.

The system can include one or more clusters. As shown in this illustrative embodiment, the system 100 can include a plurality of clusters, including cluster 110-1 and cluster 110-2. Further details regarding the clusters 110-1 and 110-2 will be described below with reference to FIG. 2.

As further shown, the system 100 can further include a database (DB) 120. The DB 120 can store one or more change events received from the clusters 110-1 and 110-2. As will be described in further detail below, the one or more change events can be collected in order to detect mutation events.

As further shown, the system 100 can further include an application programming interface (API) server 130. The one or more external commands can be executed by a container platform within a container-orchestration system. For example, in one embodiment, the API server 130 can be a Kubernetes API server. As will be described in further detail below, the API server 130 can provide one or more external commands (e.g., one or more probe commands) to, in conjunction with the change events, detect mutation events.

As further shown, the system 100 further includes at least one processing device 140. The at least one processing device 140 is configured to perform mutation event detection based on the one or more change events and the one or more external commands.

For example, the at least one processing device 140 can include an external command obtaining component 142 configured to obtain one or external commands (e.g., one or more probe commands) from the API server 130. For example, the one or more external commands can be extracted from container definitions in the API server 130. Examples of external commands (e.g., probe commands) include, but are not limited to, liveness_probe (executed periodically for checking a container's liveliness), readiness_probe (executed periodically for checking a container's readiness), lifecycle_post_start (executed only once just after starting a container), lifecycle_pre_stop (executed only once just before stopping a container), etc.

The at least one processing device 140 can further include a change event collection component 144 configured to collect one or more change events from the database 120. An example of a change event will be described in further detail below with reference to FIG. 7.

The at least one processing device 140 can further include a process tree generation component 146 configured to generate one or more process trees (or "mutation trees") based on one or more processes associated with the one or more change events. For example, in a given process tree, the parent process can have all child processes as its branch. File change events can then be the children of the corresponding process as a leaf of the branch. More specifically, the one or more process trees can be generated using process identifiers (PIDs) in each event. A PID is an identifier (e.g., number) that can be used by an operating system (OS) kernel to identify an active process. Examples of PIDs that can be used to generate the one or more process trees include, but are not limited to, PID, PPID (the PID of a parent process), PGID (the PID of a process group leader of a process group), etc.

The at least one processing device 140 can further include a mutation detection component 148. The mutation detection component 148 can be configured to perform mutation detection by comparing a root of each of the one or more process trees with the one or more external commands. The root of a given process tree is a process corresponding to an original process of events. If the root of the given process tree matches at least one of the external commands, it is determined that the root of the given process tree is a process resulting from an external command. Thus, all of the events in the given process tree are generated by an external command, and a mutation is not detected. However, if the root of the given process tree does not match at least one of the external commands, it is determined that the root of the given process tree is not a process resulting from an external command Thus, all of the events in the given process tree are generated by an external command, and a mutation is detected.

The mutation detection component 148 can be further configured to generate a mutation event report ("report") 150 based on the comparison. For example, if the comparison results in a determination that the root of the given process tree is a process resulting from an external command and thus does not correspond to a mutation, the given process tree can be omitted or excluded from the report 150. However, if the comparison results in a determination that the root of the given process tree is not a process resulting from an external command and thus corresponds to a mutation, the given process tree can be added to the report 150.

For example, in a container-orchestration system, the at least one processing device 140 can continuously monitor a container for the state of files and processes at a given sampling, and report modulo changes in the state on a user interface, that have been added to the profile whitelist as normal changes for the container. The reports can be viewed as notifications of mutations on a container by container basis, as well as a timeline for each container. Accordingly, the at least one processing device 140 can satisfy container integrity monitoring standards.

In an illustrative embodiment, the DB 120 can be configured to collect about 32,835 change events per hour, the process tree generation component 146 can be configured to generate about 4,011 process trees per hour, and 4 process tress per hour corresponding to a non-external command (e.g., non-probe) event can be detected (e.g., only 2 containers per hour).

Figure 7:
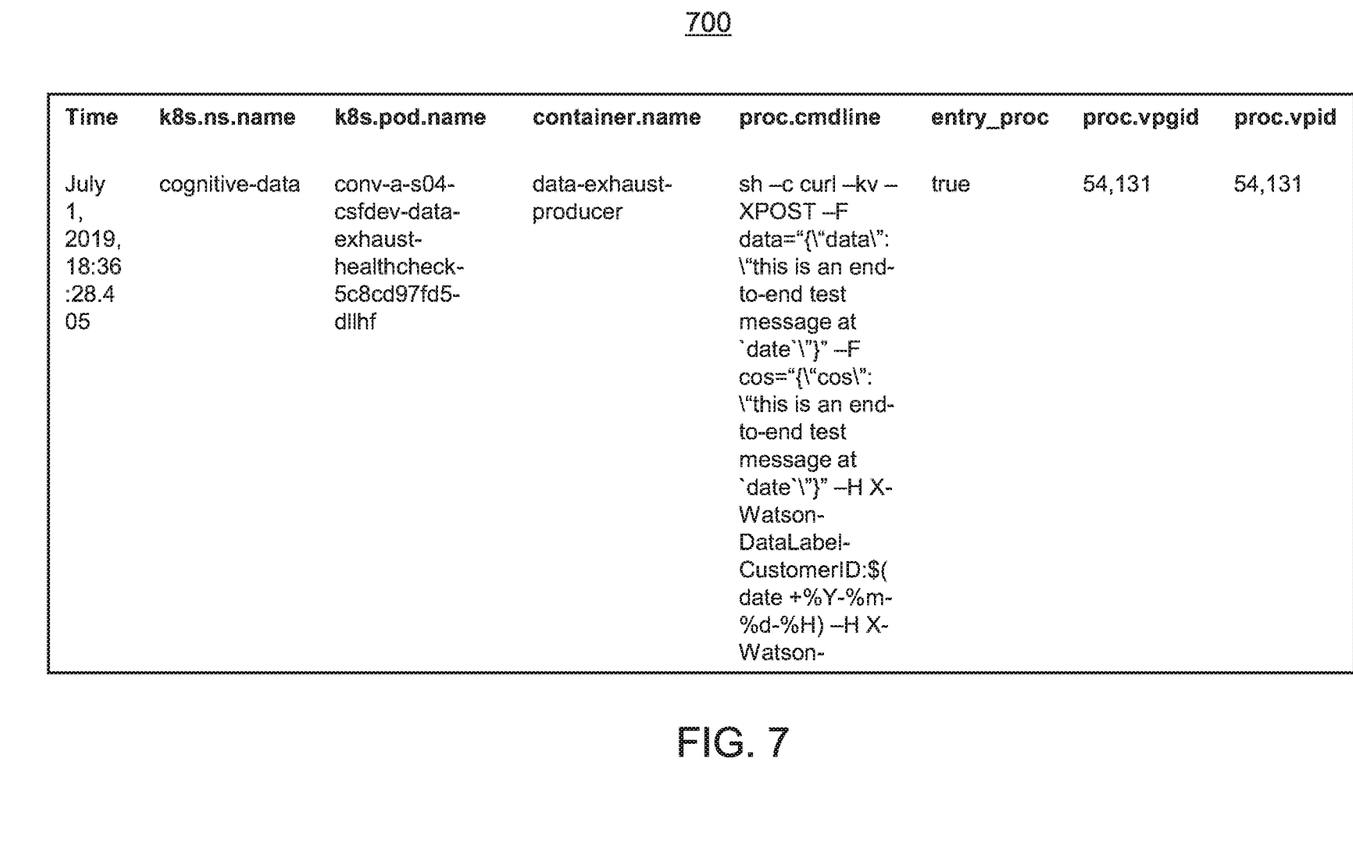
FIG. 7 is a diagram of an exemplary change event, in accordance with an embodiment of the present invention.

With reference to FIG. 7, a diagram is provided illustrating an exemplary change event 700. In this illustrative embodiment, the change event 700 is associated with a Kubernetes ("k8s") container-orchestration system. As shown, the change event 700 can include a plurality of fields, including "Time", "k8s.ns.name", "k8s.pod.name", "container.name", "proc.cmdline", "entry_proc", "proc.vpgid" and "proc.vpid".

The field "Time" provides a timestamp corresponding to the change event.

The field "k8s.ns.name" indicates the name of the namespace (ns), which in this example is "cognitive-data".

The field "k8s.pod.name" indicates the name of the pod, which in this example is "conv-a-s04-csfdev-data-exhaust-healthcheck-5c8cd97fd5-dllhf". A pod is a group of one or more containers with shared storage/network and a specification for how to run the containers.

The field "container.name" indicates a name of the container, which in this example is "data-exhaust-producer".

The field "proc.cmdline" indicates the full command line when launching the process.

The field "entry_proc" indicates if the process is another root process than the root process originated from the container entry point.

The field "proc.vpgid" indicates the process group ID of the process generating the event, as seen from its current PID namespace.

The field "proc.vpid" indicates the ID of the process generating the event as seen from its current PID namespace.

Figure 2:
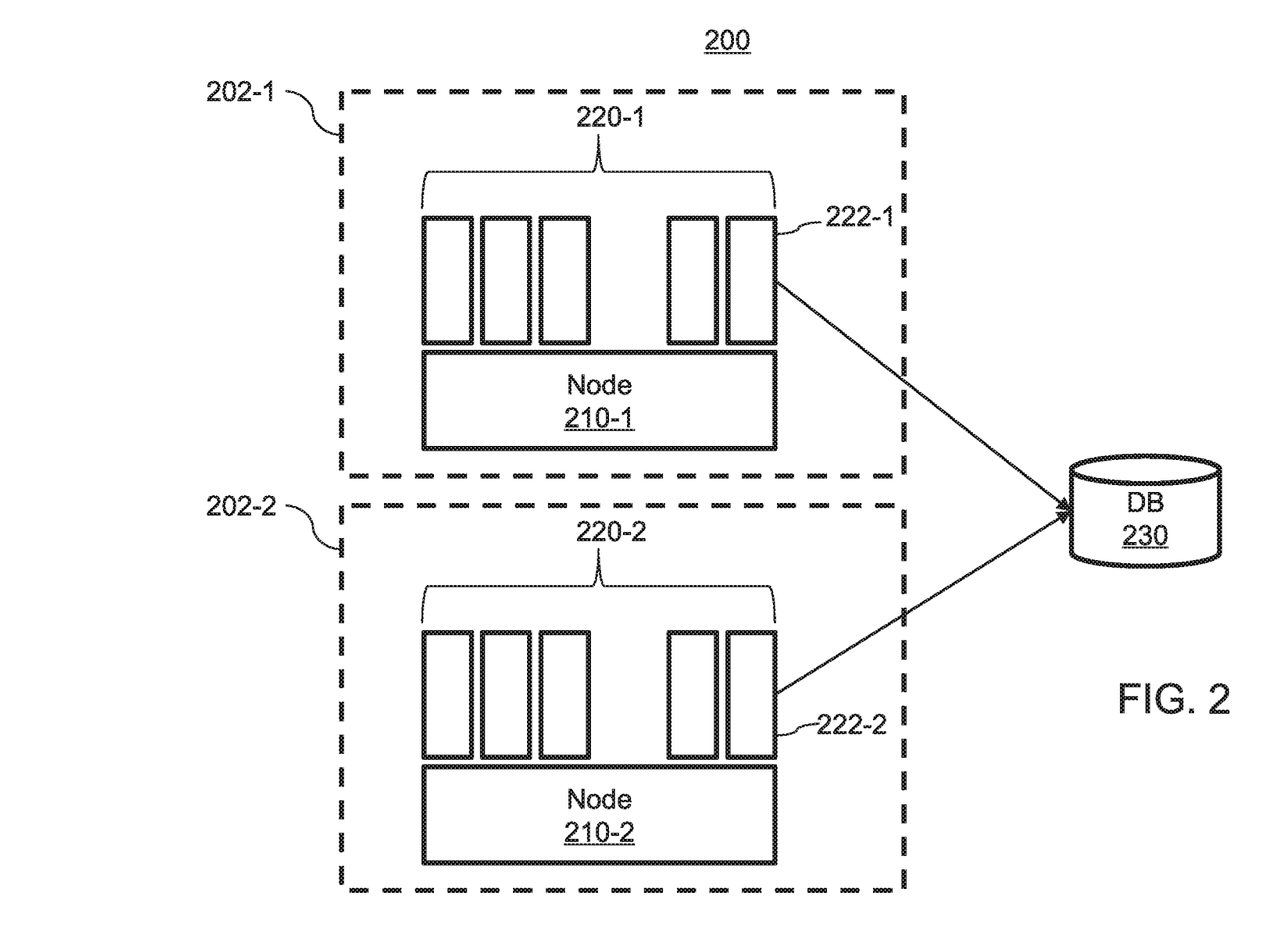
FIG. 2 is a block diagram of change event detection and storage that can be implemented in the system of FIG. 1, in accordance with an embodiment of the present invention.

With reference to FIG. 2, a system 200 is shown including a cluster 202-1 and a cluster 202-2. As shown, the cluster 202-1 can include a node 210-1 and a plurality of containers 220-1 running on the node 210-1, and the cluster 202-2 can include a node 210-2 and a plurality of containers 220-2 running on the node 210-2. The system 200 can further include a database (DB) 230.

The plurality of containers 220-1 can include a crawler container 222-1 and the plurality of containers 220-2 can include a crawler container 222-2. The crawler container 222-1 can be configured to monitor the containers 220-1 running on the node 210-1, and the crawler container 222-2 can be configured to monitor the containers 220-2 running on the node 220-2. Data observed or detected by the crawler containers 222-1 and 222-2 can then be sent to the DB 230. The DB 230 can store the data for performing mutation event detection, such as that described above with reference to FIG. 1. Any suitable crawler container can be used to implement the crawler containers 222-1 and 222-2 in accordance with the embodiments described herein. Examples of suitable crawler containers include, but are not limited to, Sysdig, In this illustrative embodiment, the system 200 is a cluster computing system including a container-orchestration system. However, such an embodiment should not be considered limiting, and the cluster computing system can include any suitable orchestration system in accordance with the embodiments described herein.

Figure 3:
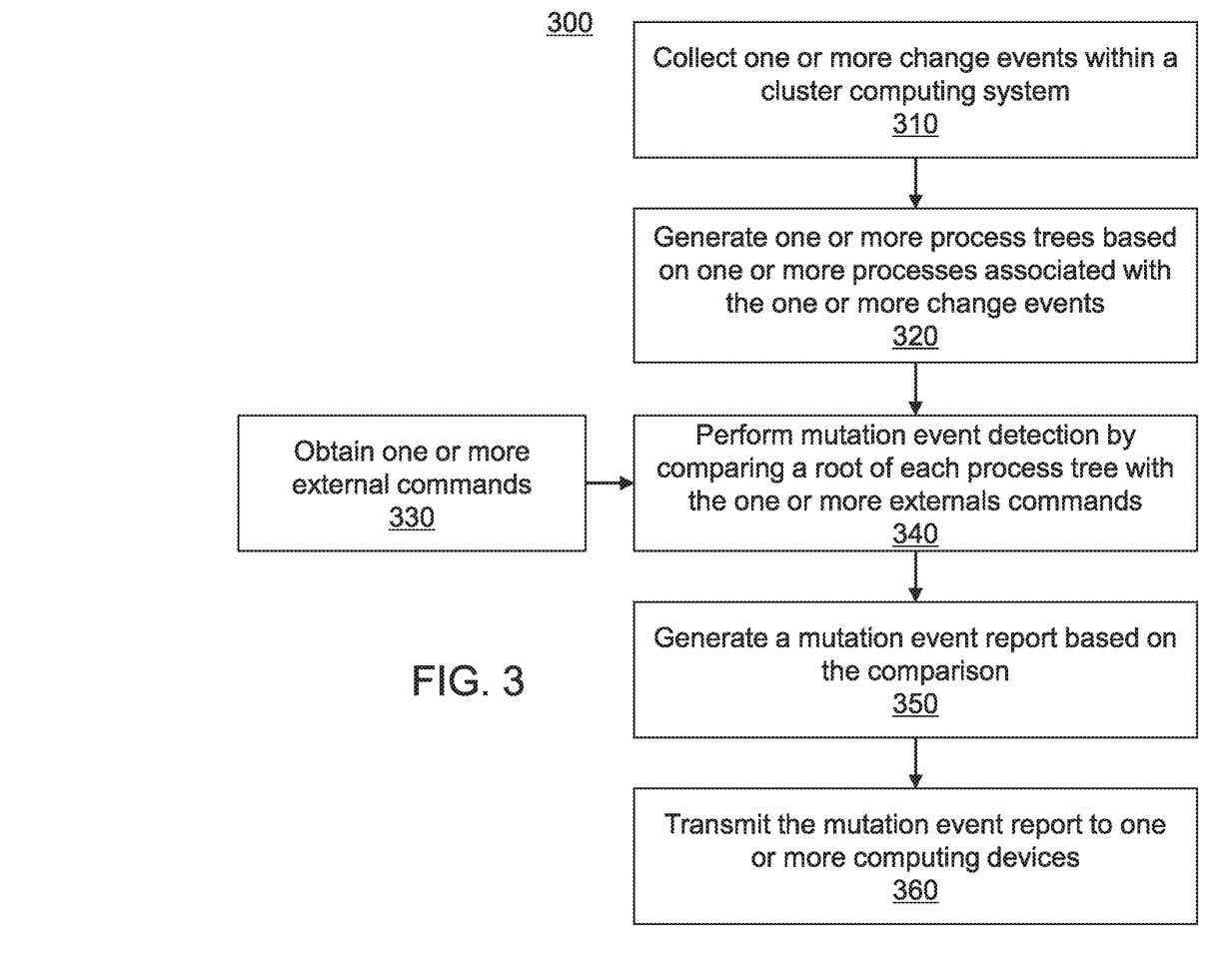
FIG. 3 is a block/flow diagram of a system/method for detecting mutation events in a cluster computing system, in accordance with an embodiment of the present invention.

With reference to FIG. 3, a block/flow diagram is shown illustrating a system/method 300 for detecting mutation events in a cluster computing system.

At block 310, one or more change events within a cluster computing system are collected. The cluster computing system can include one or more clusters each including a respective node, and collecting the one or more change events can include detecting the one or more change events in the one or more clusters, and storing the one or more detected change events in a database.

In one embodiment, the cluster computing system can include a container-orchestration system (e.g., a Kubernetes container-orchestration system), where each cluster includes a plurality of containers running on the corresponding cluster node. More specifically, a given one of the plurality of containers within a given one of the one or more clusters can be a crawler container configured to monitor the containers running on the given cluster. Any suitable process can be used to collect the one or more change events in accordance with the embodiments described herein.

At block 320, one or more process trees are generated based on one or more processes associated with the one or more change events. For example, in a given process tree, the parent process can have all child processes as its branch. File change events can then be the children of the corresponding process as a leaf of the branch. More specifically, the one or more process trees can be generated using process identifiers (PIDs) in each event. Examples of PIDs that can be used to generate the one or more process trees include, but are not limited to, PID, PPID (the PID of a parent process), PGID (the PID of a process group leader of a process group), etc. Any suitable process can be used to generate the one or more process trees in accordance with the embodiments described herein.

At block 330, one or more external commands can be obtained. The one or more external commands can correspond to intended access patterns. For example, the one or more external commands can be executed by a container platform within a container-orchestration system. In one embodiment, the one or more external commands can be obtained from an API server (e.g., a Kubernetes API server). Obtaining the one or more external commands can including extracting the one or more external commands from container definitions in the API server. Examples of external commands (e.g., probe commands) include, but are not limited to, liveness_probe (executed periodically for checking a container's liveliness), readiness_probe (executed periodically for checking a container's readiness), lifecycle_post_start (executed only once just after starting a container), lifecycle_pre_stop (executed only once just before stopping a container), etc. Any suitable process can be used to obtain the one or more external commands in accordance with the embodiments described herein.

At block 340, mutation event detection is performed by comparing a root of each process tree with the one or more external commands. More specifically, if the root of a given process tree matches at least one of the external commands, it is determined that the root of the given process tree is a process resulting from an external command. Thus, all of the events in the given process tree are generated by an external command, and a mutation is not detected. However, if the root of the given process tree does not match at least one of the external commands, it is determined that the root of the given process tree is not a process resulting from an external command Thus, all of the events in the given process tree are generated by an external command, and a mutation is detected.

The steps performed at blocks 310-340 can extract "unintended" events from the one or more change events without program or image analysis, and filter out any "intended" events or access patterns from the one or more change events that are rare or infrequently occurring.

At block 350, a mutation event report can be automatically generated based on the comparison. The mutation event report can include change events, structured as a process tree, which are caused by an unintended access (as opposed to an intended access. For example, if the comparison results in a determination that the root of the given process tree is a process resulting from an external command and thus does not correspond to a mutation, the given process tree can be omitted or excluded from the mutation event report. However, if the comparison results in a determination that the root of the given process tree is not a process resulting from an external command and thus corresponds to a mutation, the given process tree can be added to the mutation event report.

At block 360, the mutation event report can be transmitted to one or more computing devices. The one or more computing devices can be associated with one or more system administrators. The mutation event report can be shown on a user interface that can notify the system administrator(s) of any unintended changes (e.g., unintended changes to a container). The system administrator(s) can then take remedial action to address any unintended changes that show up on the mutation event report.

For example, in a container-orchestration system, the system/method 300 can continuously monitor a container for the state of files and processes at a given sampling, and report modulo changes in the state on a user interface, that have been added to the profile whitelist as normal changes for the container. The reports can be viewed as notifications of mutations on a container by container basis, as well as a timeline for each container. Accordingly, the system/method 300 can satisfy container integrity monitoring standards.

Figure 4:
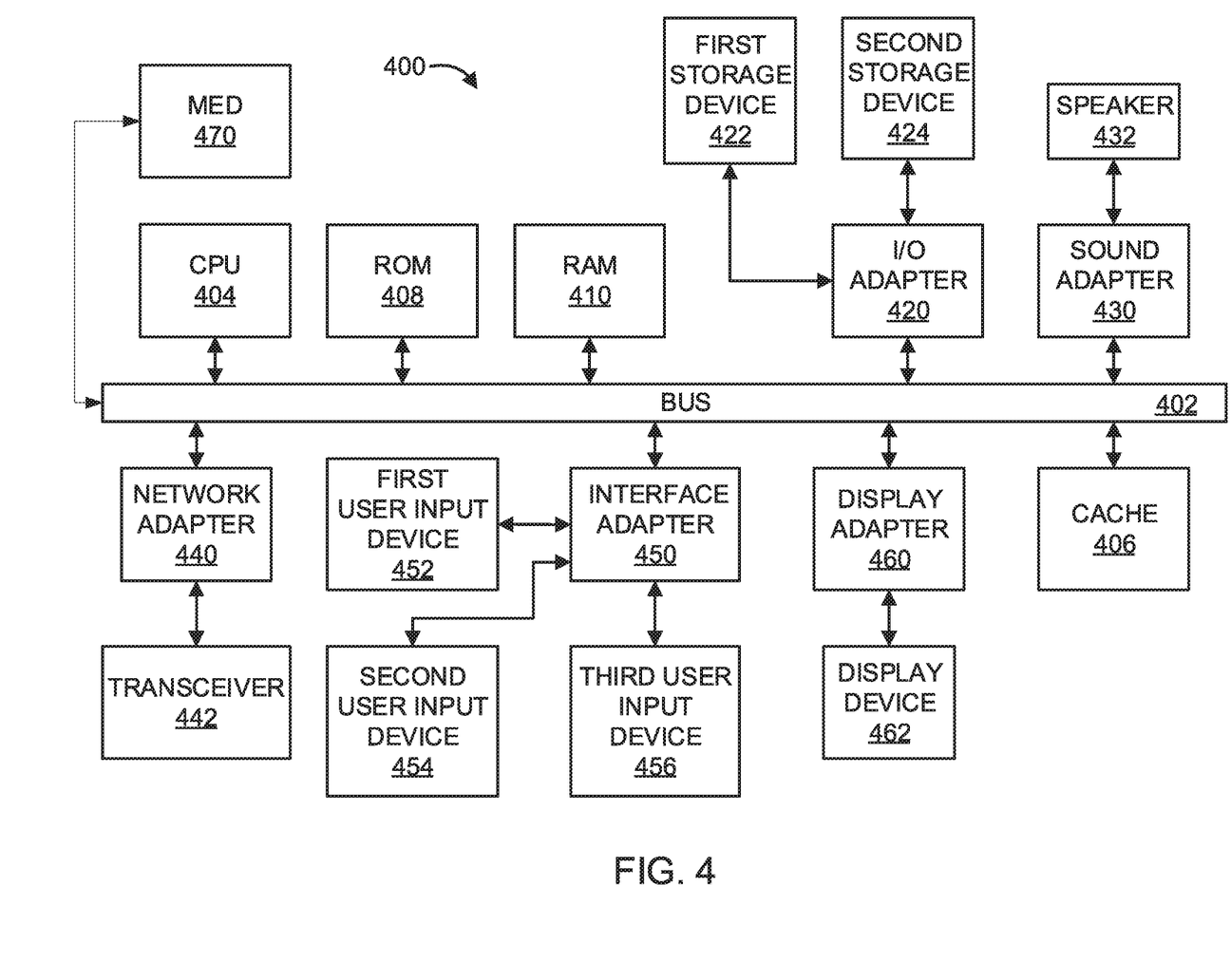
FIG. 4 is a block diagram of a processing system, in accordance with an embodiment of the present invention.

With reference to FIG. 4, an exemplary processing system 400 to which the present invention may be applied is shown in accordance with one embodiment. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Mutation event detection (MED) component 470 may be operatively coupled to system bus 402. MED component 470 is configured to sample formulations within a formulation generation system as described above. MED component 470 can be implemented as a standalone special purpose hardware device, or may be implemented as software stored on a storage device. In the embodiment in which MED component 470 is software-implemented, although shown as a separate component of the computer system 400, MED component 470 can be stored on, e.g., the first storage device 422 and/or the second storage device 424. Alternatively, MED component 470 can be stored on a separate storage device (not shown).

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
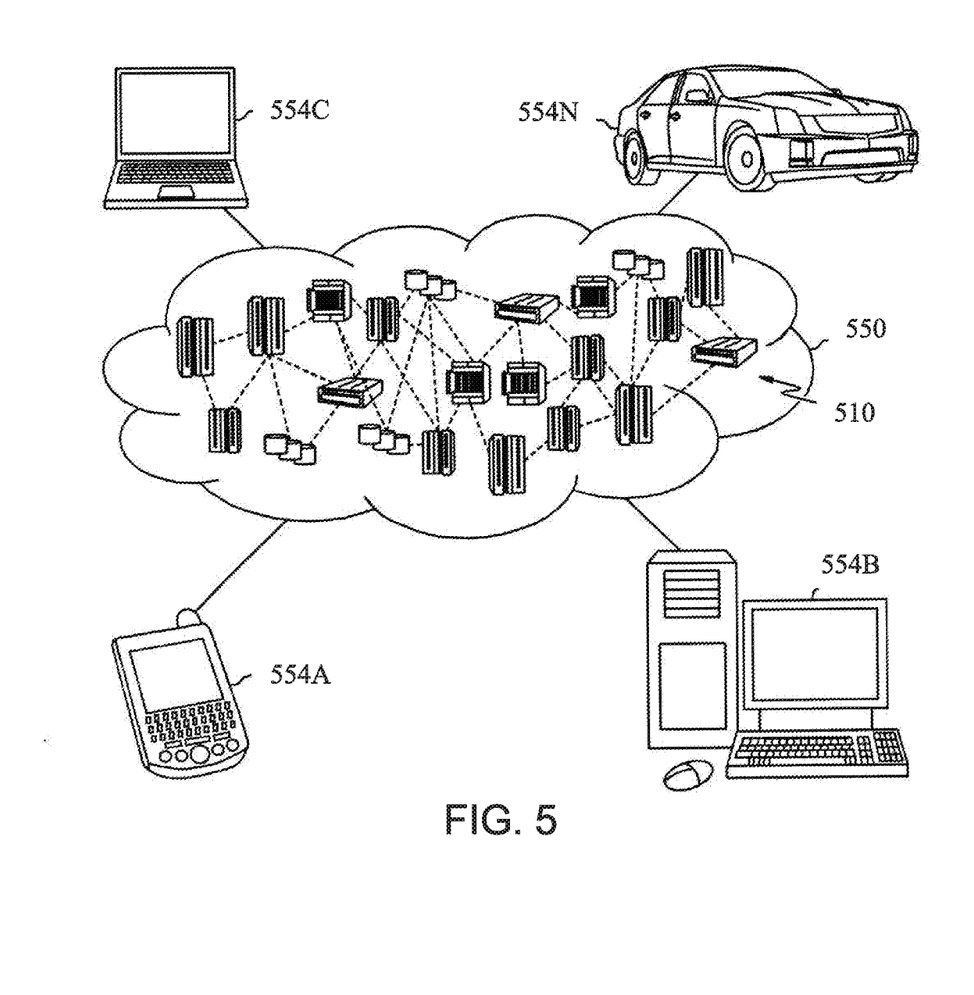
FIG. 5 is a block diagram of an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
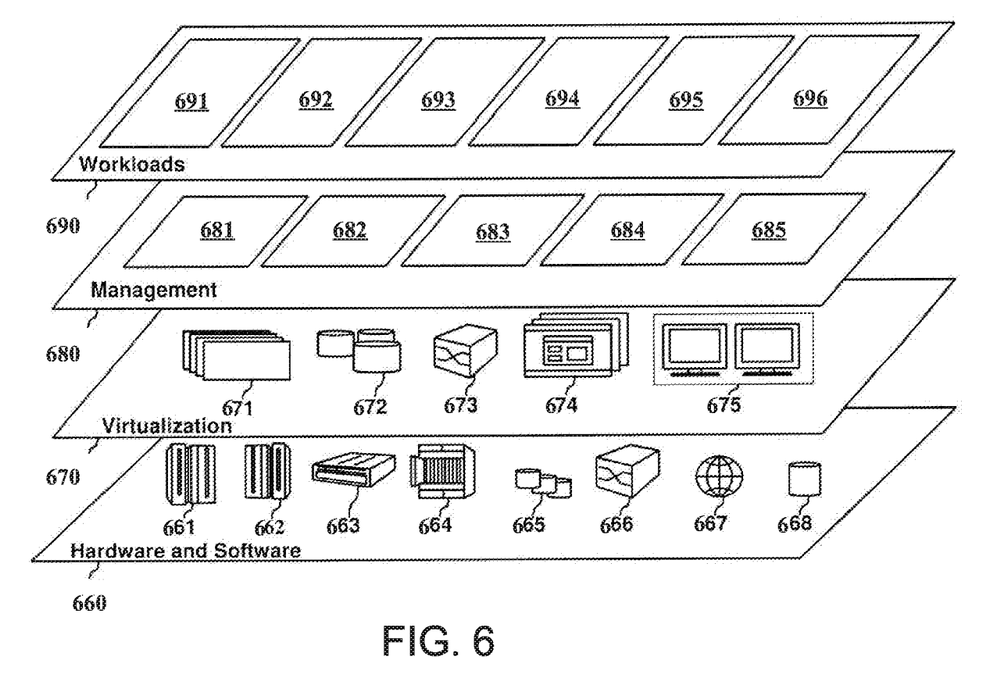
FIG. 6 is a block diagram of a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and mutation detection 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of systems and methods of mutation event detection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claim.

What is claimed is:

1. A system comprising:
a memory device for storing program code; and
at least one hardware processor operatively coupled to the memory device and configured to execute program code stored on the memory device to:
generate one or more process trees based on one or more processes associated with one or more change events within a cluster computing system;
perform mutation event detection by comparing a root of each of the one or more process trees with one or more external commands; and
generate a mutation event report based on the comparison, with the mutation report including each of the one or more process trees resulting from a command other than the one or more external commands.

2. The system of claim 1, further comprising:
a database in communication with the at least one processor device and configured to store the one or more change events; and
an application programming interface (API) server in communication with the at least one hardware processor.

3. The system of claim 2, wherein the at least one hardware processor is further configured to execute program code stored on the memory device to:
collect the one or more change events from a database; and
obtain the one or more external commands using an application programming interface (API) server.

4. The system of claim 1, wherein:
the cluster computing system includes one or more containers;
the at least one hardware processor is further configured to collect the one or more change events from the one or more containers; and
the one or more external commands are executed by a container platform.

5. The system of claim 1, wherein the one or more external commands include one or more probe commands.

6. The system of claim 1, wherein the at least one hardware processor is further configured to generate the mutation event report based on the comparison by:
determining that the root of a given one of the process trees is a process resulting from one of the external commands; and
omitting the given one of the process trees from the mutation event report.

7. The system of claim 1, wherein the at least one hardware processor is further configured to transmit the mutation event report to one or more computing devices.

8. The system of claim 1, wherein the cluster computing system includes a Kubernetes cluster computing system.

9. A computer-implemented method, comprising:
generating one or more process trees based on one or more processes associated with one or more change events within a cluster computing system;
performing mutation event detection by comparing a root of each of the one or more process trees with one or more external commands; and
generating a mutation event report based on the comparison, with the mutation report including each of the one or more process trees resulting from a command other than the one or more external commands.

10. The method of claim 9, further comprising:
collecting the one or more change events; and
obtaining the one or more external commands.

11. The method of claim 10, wherein:
the cluster computing system includes one or more containers;
collecting the one or more change events further includes collecting the one or more change events from the one or more containers; and
the one or more external commands are executed by a container platform.

12. The method of claim 9, wherein the one or more external commands include one or more probe commands.

13. The method of claim 9, wherein generating the mutation event report based on the comparison further includes:
determining that the root of a given one of the process trees is a process resulting from one of the external commands; and
omitting the given one of the process trees from the mutation event reports.

14. The method of claim 9, further comprising transmitting the mutation event report to one or more computing devices.

15. A computer program product comprising a computer readable storage medium having program instructions embodied therewith, the program instructions executable by a computer to cause the computer to perform a method comprising:

generating one or more process trees based on one or more processes associated with one or more change events within a cluster computing system;

performing mutation event detection by comparing a root of each of the one or more process trees with one or more external commands; and generating a mutation event report based on the comparison, with the mutation report including each of the one or more process trees resulting from a command other than the one or more external commands.

16. The computer program product of claim 15, wherein the method further includes:

collecting the one or more change events; and obtaining the one or more external commands.

17. The computer program product of claim 16, wherein:

the cluster computing system includes one or more containers;

collecting the one or more change events further includes collecting the one or more change events from the one or more containers; and the one or more external commands are executed by a container platform.

18. The computer program product of claim 15, wherein the one or more external commands include one or more probe commands.

19. The computer program product of claim 15, wherein generating the mutation event report based on the comparison further includes:

determining that the root of a given one of the process trees is a process resulting from one of the external commands; and omitting the given one of the process trees from the mutation event reports.

20. The computer program product of claim 15, wherein the method further includes transmitting the mutation event report to one or more computing devices.

* * * * *